| United States Patent [19] | [11] 3,742,085 |
| --- | --- |
| Bialous | [45] June 26, 1973 |

[54] THERMALLY STABLE POLYCARBONATE COMPOSITION

[75] Inventor: Charles A. Bialous, Mount Vernon, Ind.

[73] Assignee: General Electric Company, Pittsfield, Mass.

[22] Filed: July 29, 1971

[21] Appl. No.: 167,486

Related U.S. Application Data

[62] Division of Ser. No. 28,987, April 15, 1970, Pat. No. 3,651,174.

[52] U.S. Cl...... 260/827, 260/45.75 R, 260/47 XA, 260/824 R, 260/860, 260/873
[51] Int. Cl... C08g 47/10, C08g 49/04, C08f 29/16
[58] Field of Search.............................. 260/827, 824

[56] References Cited
UNITED STATES PATENTS

| 3,647,747 | 3/1972 | Bialous | 260/45.75 |
| 2,999,835 | 9/1961 | Goldberg | 260/824 |
| 3,651,174 | 3/1972 | Bialous | 260/873 |

FOREIGN PATENTS OR APPLICATIONS

| 938,931 | 10/1963 | Great Britain | 260/873 |

*Primary Examiner*—Samuel H. Blech
*Attorney*—William F. Mufatti et al.

[57] ABSTRACT

A polycarbonate composition consisting of an aromatic polycarbonate with 0.1 to about 2.0 weight percent of an alkaline earth carbonate and a mixture of an organosiloxane polymer and a polytetrafluoroethylene. The amounts of the organosiloxane polymer and polytetrafluoroethylene may be present in an amount of 0.1–2.0 weight percent each based on the weight of the polycarbonate. More specifically, the alkaline earth carbonate which can be employed herein is barium carbonate.

5 Claims, No Drawings

THERMALLY STABLE POLYCARBONATE COMPOSITION

This application is a division of U. S. Patent application Ser. No. 28987 filed April 15, 1970, now U.S. Pat. No. 3,651,174, issued Mar. 21, 1972.

This invention relates to a flame retardant thermoplastic aromatic polycarbonate composition having excellent resistance to color degradation at high temperatures, and more particularly to a flame retardant aromatic polycarbonate having in admixture therewith an alkaline earth carbonate, an organosiloxane polymer and polytetraflouroethylene.

It is well known in the art to prepare flame retardant polycarbonate compositions by employing halogen substituted bisphenol-A in the preparation thereof. Specifically, U.S. Pat. No. 3,334,154 discloses such a composition wherein tetrabromobisphenol-A is employed to prepare a polycarbonate composition having excellent flame retardant properties. Thermoplastic compositions exhibiting flame retardant properties are in demand by the industry because of safety requirements. In fact, many applications for thermoplastics carry the requirements that the thermoplastic be flame retardant, particularly where they are used by the public or are employed in areas where the public may gather.

As thermoplastics, particularly polycarbonates, find greater use in many new applications, there is a definite trend to higher molding temperatures due to the complicated geometry of the part being molded and/or the thinner sections of the molding. Higher molding temperatures are necessary in order for the polycarbonate to fill the mold cavity and thereby produce a satisfactory molded shape even though complicated in the design. Unfortunately, when employing flame retardant polycarbonate compositions as disclosed by the prior art, color degradation of the flame retardant polycarbonate composition occurs when exposed to the high molding temperatures. This color degradation results not only in poor esthetic qualities but in brittleness of the polycarbonate part.

It has heretobefore been discovered as disclosed in U.S. patent application Ser. No. 28952 filed April 15, 1970, now U.S. Pat. No. 3,647,747, issued Mar. 7, 1972, that by incorporating an alkaline earth carbonate with the particular flame retardant polycarbonate composition, the polycarbonate composition is resistant to color degradation and resistant to embrittlement when the composition is exposed to higher molding temperatures. While this in itself is an advance in the art, it has now been discovered that improved thermal stability is necessary when a polycarbonate composition is subjected to repeated high molding temperatures.

Therefore, it has now been discovered that by incorporating particular additives with a flame retardant polycarbonate composition containing therewith an alkaline earth carbonate, improved resistance to color degradation and embrittlement is achieved.

Therefore, it is the object of this invention to provide a composition that is stable at higher temperatures.

It is a further object of this invention to provide a flame retardant polycarbonate composition having resistance to color degradation.

It is another object of this invention to provide a flame retardant polycarbonate composition that is resistant to embrittlement at higher temperatures.

These and other objects of this invention will become apparent in the following detailed description thereof.

Briefly, according to this invention, the foregoing and other objects are attained by incorporating with an aromatic flame retardant polycarbonate an alkaline earth carbonate, an organosiloxane polymer and polytetrafluoroethylene. Specifically, the composition consists of a particular flame retardant polycarbonate, 0.1 to about 2.0 weight percent of an alkaline earth carbonate and 0.1 to about 2.0 weight percent each of an organosiloxane polymer and polytetrafluoroethylene.

The following examples are set forth to illustrate more clearly the principle and practice of this invention to those skilled in the art. Unless otherwise specified, where parts or percents are mentioned, they are parts or percents by weight.

EXAMPLE I

A molding composition is prepared by mixing (a) 1 part of a copolymer prepared by reacting 50 weight percent of 2,2-bis-(4-hydroxyphenyl) propane (hereinafter referred to as bisphenol-A), 50 weight percent of 2,2-(3,3',5,5'-tetra-bromo 4,4'-dihydroxydiphenyl) propane and phosgene in an organic reaction medium having therein paratertiarybutylphenol, pyridine and calcium hydroxide, which organic reaction medium is methylene chloride, and (b) 4 parts of a bis-phenol-A homopolymer prepared by reacting bisphenol-A with phosgene in methylene chloride containing therein triethylamine, paratertiarybutylphenyl and calcium hydroxide. The polymer is then recovered from solution in solid form, dried overnight at 125°C and extruded at a temperature of about 525°F. The extrudate is comminuted into pellets.

The above molding composition is then injection molded into test specimens of 3 × 2 × 0.125 inch thick at a temperature of 700°F.

The test specimens exhibit severe color degradation as observed by dark streaks appearing in the molded shape and embrittlement as observed by the molded specimens breaking as they are ejected from the mold.

EXAMPLE II

Example I is repeated except that about 0.5 percent of barium carbonate is employed herein with the composition of Example I.

The molded specimens are molded at a temperature of 730°F and the specimens exhibited brittle breaking upon ejection from the mold and severe color degradation as noted by dark streaks appearing in the molded shape.

EXAMPLE III

Example I is repeated except that 0.5 percent of barium carbonate and 0.5 percent of an organosiloxane polymer which is a co-hydrolysate of $CH_3SiCl_3$, $(CH_3)_2SiCl_2$ and $(CH_3)_3SiCl$, which organosiloxane polymer is sold under the trademark DF-581 of General Electric Company, is mixed with the composition of Example I and the test specimens are injection molded at a temperature of 730°F.

The molded specimens do not break upon ejection from the mold and no color degradation is observed.

EXAMPLE IV

Example III is repeated except that the test specimens are molded at a temperature of 740°F. The molded specimens exhibit brittle breaking upon ejection from the mold and severe color degradation is observed.

EXAMPLE V

Example I is repeated except that 0.5% of barium carbonate, 0.5 percent of an organosiloxane polymer in liquid form as disclosed in Example III and 1.0 percent of poly(tetrafluoroethylene) in finely divided form are added to the composition of Example I.

The above composition is then injection molded into test specimens of 3 × 2 × 0.125 inch thick at a molding temperature of 740°F.

No brittle breaking occurs upon ejection from the mold and no color degradation is observed.

As shown in the examples, the use of an alkaline earth carbonate with an organosiloxane polymer and polytetrafluoroethylene greatly enhances the properties of a flame retardant polycarbonate composition so as to allow the molding thereof at elevated temperatures without color degradation or embrittlement.

The instant invention is directed to a polycarbonate composition and more particularly to a flame retardant polycarbonate composition having excellent resistance to color degradation and embrittlement when molded at higher temperatures. Specifically, the composition consists of in admixture an aromatic polycarbonate, 0.10 to about 2.0 weight percent of an alkaline earth carbonate, and 0.1 to about 2.0 weight percent each of a mixture of an organopolysiloxane polymer and polytetrafluoroethylene. The weight of the additives is based on the total weight of the composition. The aromatic polycarbonate employed herein may be either a homopolymer of a halogenated substituted dihydric phenol, a copolymer of an unsubstituted dihydric phenol and a halogenated substituted dihydric phenol, a mixture of both, or a mixture thereof with a homopolymer of an unsubstituted dihydric phenol. Preferably the mixture may be 30–99 weight percent and more particularly 70–99 weight percent of a homopolymer of an unsubstituted dihydric phenol and correspondingly 70–1 weight percent and more particularly 30–1.0 weight percent of a copolymer of (1) 75–25 weight percent of a tetrahalogenated bisphenol-A and, correspondingly, (2) 25–75 weight percent of a dihydric phenol. The weight percent of the above is based on the total weight of the mixture.

The organosiloxane polymers employed in the practice of the invention are those organosiloxane polymers which are preferably in liquid form and are the co-hydroylsates of compounds of the following formulae:

wherein R may be independently selected from the group consisting of aryl, alkyl, substituted aryl or substituted alkyl radicals containing from 1–10 carbon atoms. Examples of such are methyl trichloro silane, ethyl trichloro silane, phenyl trichloro silane, p-chlorophenyl trichloro silane, dimethyl dichloro silane, diethyl dichloro silane, diphenyl dichloro silane, bis(p-chlorophenyl) dichloro silane, trimethyl chloro silane, triethyl chloro silane, tri-phenyl chloro silane, tris (p-chlorophenyl) chloro silane, etc. and mixtures thereof.

In general, the unsubstituted and halogen substituted dihydric phenols employed herein are the dihydric bisphenols or polynuclear aromatic compounds, containing as functional groups, two hydroxyl radicals, each of which is attached directly to a carbon atom of an aromatic nucleus. Typical of some of the dihydric phenols that may be employed in the practice of this invention are bis(4-hydroxyphenyl) methane, 2,2-bis(4-hydroxyphenyl) propane, 2,2-bis(4-hydroxy-3-methylphenyl) propane, 4,4-bis(4-hydroxyphenyl) heptane, 2,2-(3,5,3′,5′-tetrachloro-4,4′-dihydroxydiphenyl) propane, 2,2-(3,5,3′5′-tetrabromo-4,4′-dihydroxydiphenyl) propane, (3,3′-dichloro-4,4′-dihydroxydiphenyl) methane. Other dihydric phenols of the bisphenol type are also available and are disclosed in U.S. Pat. Nos. 2,999,835, 3,028,365 and 3,334,154.

Generally, the polycarbonate employed herein may be prepared by reacting a dihydric phenol with a carbonate precursor in the presence of a molecular weight regulator, an acid acceptor and a catalyst. The preferred carbonate precursor generally employed in preparing carbonate polymers is carbonyl chloride. However, other carbonate precursors may be employed and this includes other carbonyl halides, carbonate esters or haloformates.

The acid acceptors, molecular weight regulators and catalysts employed in the process of preparing polycarbonates are well known in the art and may be any of those commonly used to prepare polycarbonates.

As stated previously, the particular additive employed herein to provide the polycarbonate composition having excellent resistance to color degradation and resistance to brittleness at the high molding temperatures is an alkaline earth carbonate. The alkaline earth carbonates employed herein are barium carbonate, strontium carbonate, calcium carbonate, magnesium carbonate and beryllium carbonate. The preferred carbonate to be employed in the practice of this invention is barium carbonate.

The polytetrafluoroethylene employed herein in the practice of this invention must be in finely divided powder form. The polytetrafluoroethylene is uniformly dispersed throughout the composition.

It will thus be seen that the objects set forth above among those made apparent from the preceding description are efficiently attained and since certain changes made be made in carrying out the above process and in the composition set forth without departing from the scope of this invention, it is intended that all matters contained in the above description shall be interpreted as illustrative and not in a limiting sense.

What is claimed is:

1. A polycarbonate composition consisting of in admixture (A) an aromatic polycarbonate selected from the group consisting of (1) a polycarbonate of a halogen substituted dihydric phenol, (2) a co-polycarbonate of an unsubstituted dihydric phenol and a halogen substituted dihydric phenol, (3) a mixture of (1) and (2), and (4) a mixture of a member selected from the group consisting of (1), (2) and (3) with a polycarbonate of an unsubstituted dihydric phenol, (B) 0.1 to about 2.0 weight percent of an alkaline earth carbonate and (C) 0.1 – 2.0 weight percent each of a mixture of an organosiloxane polymer wherein the organo-substituents therein are alkyl or aryl radicals, and polytetrafluoroethylene; said weight percent being based on the total weight of the polycarbonate composition; said halogen being selected from the group consisting of bromine and chlorine.

2. The composition of claim 1 wherein the aromatic polycarbonate is a mixture of 30–99 weight percent of a polycarbonate of a dihydric phenol and correspondingly, 70–1 weight percent of a copolycarbonate of 25–75 weight percent of a dihydric phenol and 75–25 weight percent of tetra halogenated bisphenol-A.

3. The composition of claim 1 wherein the aromatic polycarbonate is a copolycarbonate of bisphenol-A and 3,3',5,5'-tetrachlorobisphenol-A.

4. The composition of claim 1 wherein the aromatic polycarbonate is a copolycarbonate of bisphenol-A and 3,3',5,5'-tetrabromobisphenol-A.

5. The composition of claim 1 wherein the alkaline earth carbonate is barium carbonate.

* * * * *